US010129573B1

(12) United States Patent
Sahasrabudhe et al.

(10) Patent No.: US 10,129,573 B1
(45) Date of Patent: Nov. 13, 2018

(54) IDENTIFYING RELEVANCE OF A VIDEO

(71) Applicant: Microsoft Technology Licensing, LLC, Redmond, WA (US)

(72) Inventors: Amita Sahasrabudhe, New York, NY (US); Christopher Ng, Long Island City, NY (US); Pengfei Li, San Francisco, CA (US); Jonathan L. Sherman-Presser, San Francisco, CA (US); Mikhail Burshteyn, New York, NY (US); Shane Afsar, Long Island City, NY (US); Yilin Li, Jersey City, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/710,035

(22) Filed: Sep. 20, 2017

(51) Int. Cl.
| H04N 9/80 | (2006.01) |
| H04N 5/93 | (2006.01) |
| G11B 27/00 | (2006.01) |
| H04N 21/235 | (2011.01) |
| G11B 27/28 | (2006.01) |
| G06F 17/30 | (2006.01) |

(52) U.S. Cl.
CPC ... H04N 21/2353 (2013.01); G06F 17/30784 (2013.01); G11B 27/28 (2013.01)

(58) Field of Classification Search
USPC .................................................. 386/278, 248
See application file for complete search history.

(56) References Cited

U.S. PATENT DOCUMENTS

| 2008/0254434 A1* | 10/2008 | Calvert ..................... G09B 5/00 434/350 |
| 2009/0204470 A1* | 8/2009 | Weyl ....................... G06Q 10/06 705/7.13 |
| 2009/0313546 A1* | 12/2009 | Katpelly ............ H04N 7/17318 715/723 |
| 2014/0244252 A1* | 8/2014 | Dines .................... G10L 15/183 704/235 |
| 2018/0039627 A1* | 2/2018 | Reiley ............... G06F 17/30035 |
| 2018/0143956 A1* | 5/2018 | Skarbovsky ............ G06F 17/24 |

* cited by examiner

*Primary Examiner* — Nigar Chowdhury
(74) *Attorney, Agent, or Firm* — Schwegman Lundberg & Woessner, P.A.

(57) ABSTRACT

Techniques for identifying relevance of a video are disclosed herein. In some embodiments, a computer-implemented method comprises: causing a video to be played on a device of a user; receiving, from the device, an instruction to share the video with another user, the instruction corresponding to a point-in-time in the video; identifying text in a transcript of the video based on the point-in-time; causing the identified text to be displayed on the device based on the instruction to share the video; receiving, from the device, an instruction to include user-approved text along with the video in the sharing of the video with the one or more other users, the user-approved text comprising at least a portion of the identified text; and causing the user-approved text to be displayed on a device of the other user in association with the video based on the instructions to share and include.

20 Claims, 17 Drawing Sheets

IDENTIFYING RELEVANCE OF A VIDEO

TECHNICAL FIELD

The present application relates generally to modifying the presentation of video and, in one specific example, to methods and systems of identifying relevance of a video.

BACKGROUND

Video is a powerful medium for conveying information. However, the relevance of a particular video to a user is not always apparent to that user, particularly when the video is long in duration. In situations involving a long video, even if there is something relevant to the user in the video, there are often portions of the video that are irrelevant to the user. Consequently, the user plays irrelevant portions of the video in an attempt to find one or more relevant portions. As a result, electronic resources (e.g., network bandwidth over which video is transmitted, battery of device on which video is played) are excessively consumed.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
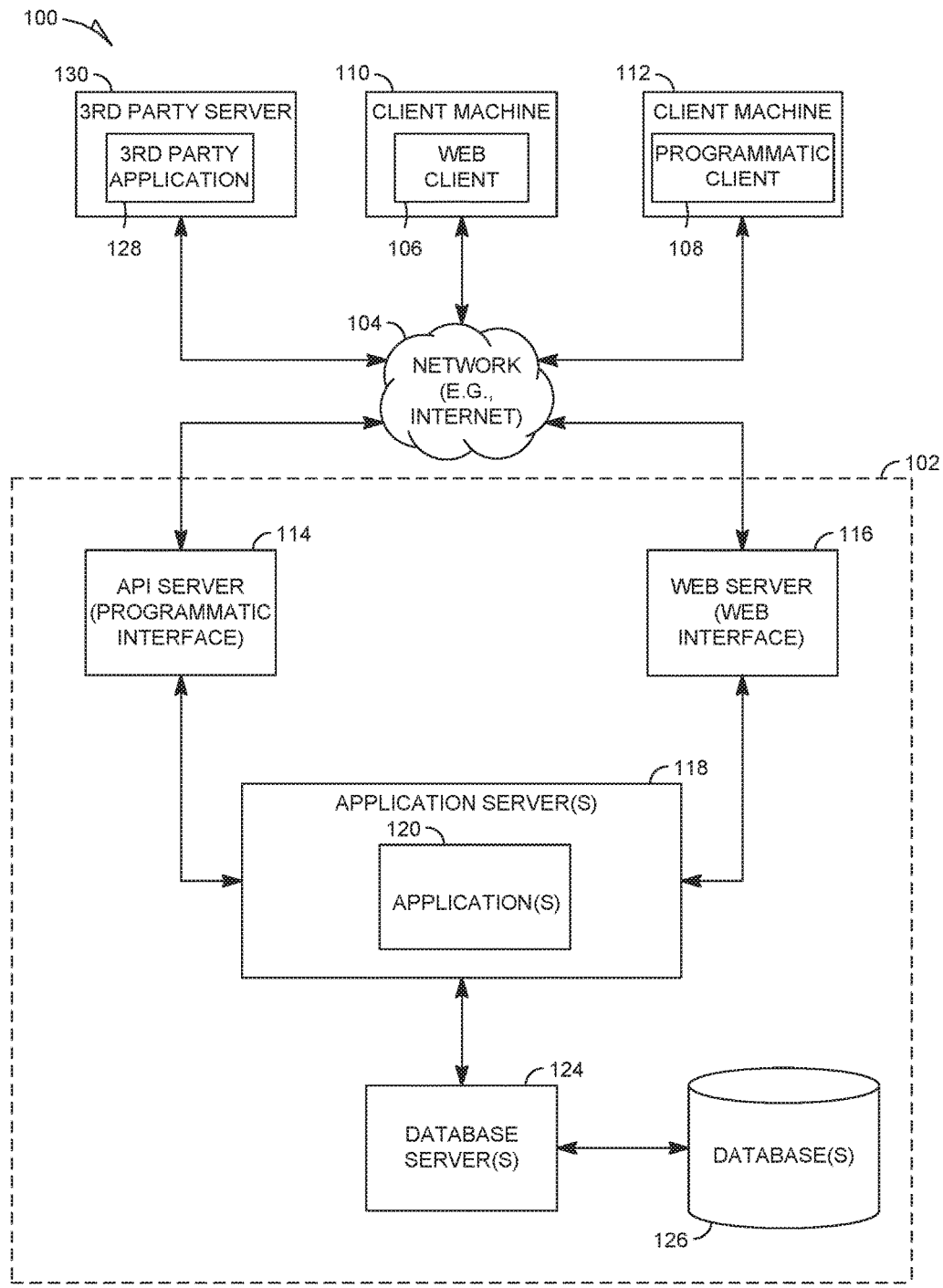
FIG. 1 is a block diagram illustrating a client-server system, in accordance with an example embodiment.

Example methods and systems of identifying relevance of a video are disclosed. In the following description, for purposes of explanation, numerous specific details are set forth in order to provide a thorough understanding of example embodiments. It will be evident, however, to one skilled in the art that the present embodiments may be practiced without these specific details.

In some example embodiments, operations are performed by a machine having at least one memory and at least one hardware processor, with the operations comprising: causing a video to be played on a first device of a first user; receiving, from the first device of the first user, an instruction to share the video with one or more other users, the instruction corresponding to a first point-in-time in the video; accessing a transcript of the video; identifying text in the transcript based on the first point-in-time; causing the identified text to be displayed on the first device based on the instruction to share the video; receiving, from the first device, an instruction to include user-approved text along with the video in the sharing of the video with the one or more other users, the user-approved text comprising at least a portion of the identified text; and causing the user-approved text to be displayed on one or more other devices of the one or more other users in association with the video based on the instruction to share the video and on the instruction to include the user-approved text.

In some example embodiments, the user-approved text comprises text for which an indication of an intent to include the text along with a video in a sharing of the video has been received from a user. For example, in response to a user selecting a selectable user interface element (e.g., a "SEND" button) associated with a text field that contains text (e.g., text entered by a computer system of the present application via auto-population of the text field, text entered by the user, a combination of auto-populated text and text entered by the user), a computer system of the present application may identify the text in the text field as user-approved text.

In some example embodiments, receiving the instruction to share the video comprises detecting a user selection of a graphical user interface element during the playing of the video on the first device, the user selection having been made at the first point-in-time in the video during the playing of the video on the first device.

In some example embodiments, the receiving the instruction to include the user-approved text comprises receiving, from the first device, an edited version of the identified text, the edited version representing at least one edit of the identified text by the first user, the at least one edit comprising at least one addition of text to the identified text or at least one deletion of text from the identified text. In some example embodiments, the operations further comprise editing a stored version of the transcript of the video based on the at least one edit of the identified text. In some example embodiments, the operations further comprise: generating the transcript of the video using a speech-to-text algorithm; and modifying the speech-to-text algorithm based on the at least one edit of the identified text.

In some example embodiments, the causing the user-approved text to be displayed comprises causing the user-approved text to be displayed on the one or more other devices of the one or more other users concurrently with a preview of the video on the one or more other devices, the video comprising a plurality of frames, the preview of the video comprising at least one of the plurality of frames of the video and less than all of the plurality of frames of the video. In some example embodiments, the operations further comprise: selecting the at least one of the plurality of frames based on the first point-in-time in the video; and generating the preview based on the selected at least one of the plurality of frames, the preview comprising the selected at least one of the plurality of frames. In some example embodiments, the selecting the at least one of the plurality of frames is further based on at least one supplemental point-in-time in the video, the at least one supplemental point-in-time corresponding to at least one other instruction received from at least one other user to share the video. In some example embodiments, the operations further comprise selecting the at least one supplemental point-in-time for use in the selecting the at least one of the plurality of frames based on a comparison of at least one characteristic of the at least one other user from which the at least one other instruction was received with at least one characteristic of the first user or with at least one characteristic of the video.

In some example embodiments, the causing the user-approved text to be displayed comprises causing the user-approved text to be displayed on the one or more other devices of the one or more other users concurrently with a playing of the video on the one or more other devices. In some example embodiments, the operations further comprise: determining a start point-in-time in the video at which to begin the playing of the video on the one or more other devices based on the first point-in-time; and causing the video to be played on the one or more other devices beginning at the start point-in-time. In some example embodiments, the determining the start point-in-time comprises: analyzing at least one of the video and the transcript of the video using the first point-in-time; and determining the start point-in-time based on the analyzing, the start point-in-time being an earlier time in the video than the first point-in-time. In some example embodiments, the determining of the start point-in-time is further based on at least one supplemental point-in-time in the video, the at least one supplemental point-in-time corresponding to at least one other instruction received from at least one other user to share the video. In some example embodiments, the operations further comprise selecting the at least one supplemental point-in-time for use in the determining of the start point-in-time based on a comparison of at least one characteristic of the at least one other user from which the at least one other instruction was received with at least one characteristic of the first user or with at least one characteristic of the video.

In some example embodiments, the causing the user-approved text to be displayed comprises causing a point-of-interest to be displayed along a video progress bar on the one or more other devices concurrently with the playing of the video on the one or more other devices, the point-of-interest being determined based on the first point-in-time, the user-approved text being displayed in association with the point-of-interest.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Programming Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
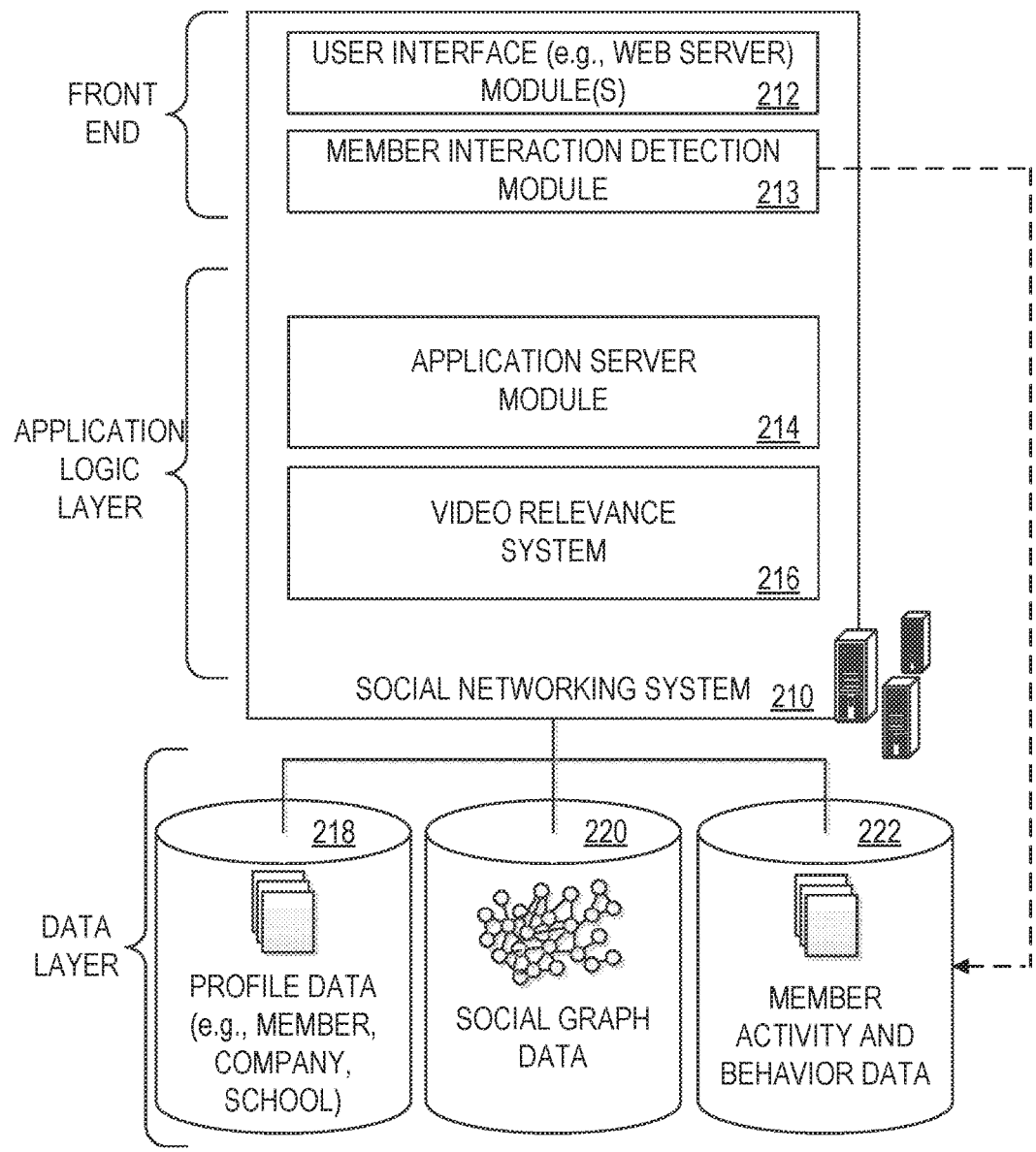
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as video relevance system 216, for use in social networking system 210, consistent with some embodiments of the present disclosure. In some embodiments, the video relevance system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the video relevance system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the video relevance system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the video relevance system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
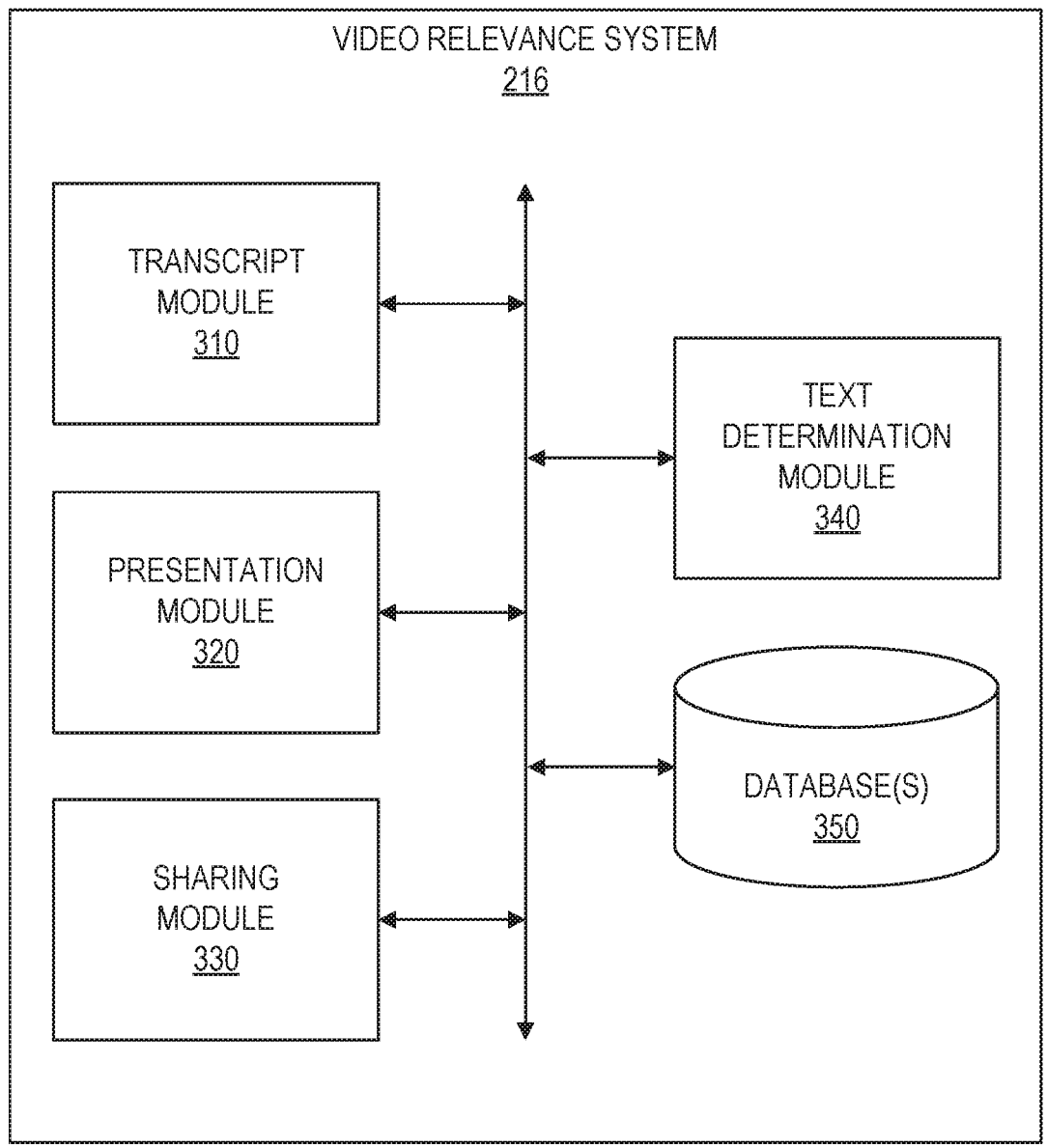
FIG. 3 is a block diagram illustrating components of a video relevance system, in accordance with an example embodiment.

FIG. 3 is a block diagram illustrating components of the video relevance system 216, in accordance with an example embodiment. In some embodiments, the video relevance system 216 comprises any combination of one or more of a transcript module 310, a presentation module 320, a sharing module 330, a text determination module 340, and one or more database(s) 350. The modules 310, 320, 330, and 340 and the database(s) 350 can reside on a machine having a memory and at least one processor (not shown). In some embodiments, the modules 310, 320, 330, and 340 and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the modules 310, 320, 330, and 340, as well as the database(s) 350, are also within the scope of the present disclosure.

In some example embodiments, one or more of the modules 310, 320, 330, and 340 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screens, cameras, tactile sensors, light sensors, infrared sensors, biometric sensors, microphones, gyroscopes, accelerometers, other sensors, and so forth). In some example embodiments, one or more of the modules 310, 320, 330, and 340 are configured to receive user input. For example, one or more of the modules 310, 320, 330, and 340 can present one or more GUI elements (e.g., a drop-down menu, selectable buttons, a text field) with which a user can submit input. FIGS. 4-9, which will be discussed in further detail later, provide examples of graphic user interfaces.

In some example embodiments, one or more of the modules 310, 320, 330, and 340 are configured to perform various communication functions to facilitate the functionality described herein, such as by communicating with the social networking system 210 via the network 104 using a wired or wireless connection. Any combination of one or more of the modules 310, 320, 330, and 340 may also provide various web services or functions, such as retrieving information from the third party servers 130 and the social networking system 210. Information retrieved by the any of the modules 310, 320, 330, and 340 may include profile data corresponding to users and members of the social networking service of the social networking system 210.

Additionally, any combination of one or more of the modules 310, 320, 330, and 340 can provide various data functionality, such as exchanging information with database (s) 350 or servers. For example, any of the modules 310, 320, 330, and 340 can access member profiles that include profile data from the database(s) 350, as well as extract attributes and/or characteristics from the profile data of member profiles. Furthermore, the one or more of the modules 310, 320, 330, and 340 can access social graph data and member activity and behavior data from database(s) 350, as well as exchange information with third party servers 130, client machines 110, 112, and other sources of information.

In some example embodiments, the transcript module 310 is configured to generate a transcript of a video using a speech-to-text algorithm. For example, the transcript module 310 may access, retrieve, or otherwise receive audio of a video, and then use speech recognition to translate the audio into text, generating a textual transcript of the audio of the video, which may be stored in a database (e.g., database (s) 350) for subsequent access. In some example embodiments, the generated transcript comprises a sequence of a plurality of portions of text, with each portion of text having and being stored in association with a corresponding timestamp. For example, the first portion of text in the sequence may have a corresponding timestamp of 5 seconds into the video, the second portion of text in the sequence may have a corresponding timestamp of 13 seconds into the video, the third portion of text in the sequence may have a corresponding timestamp of 19 seconds into the video, and so on and so forth, thereby enabling a time series mapping the sequence of portions of text to the points-in-time in the video at which the audio to which those portions of text occurs.

Figure 4:
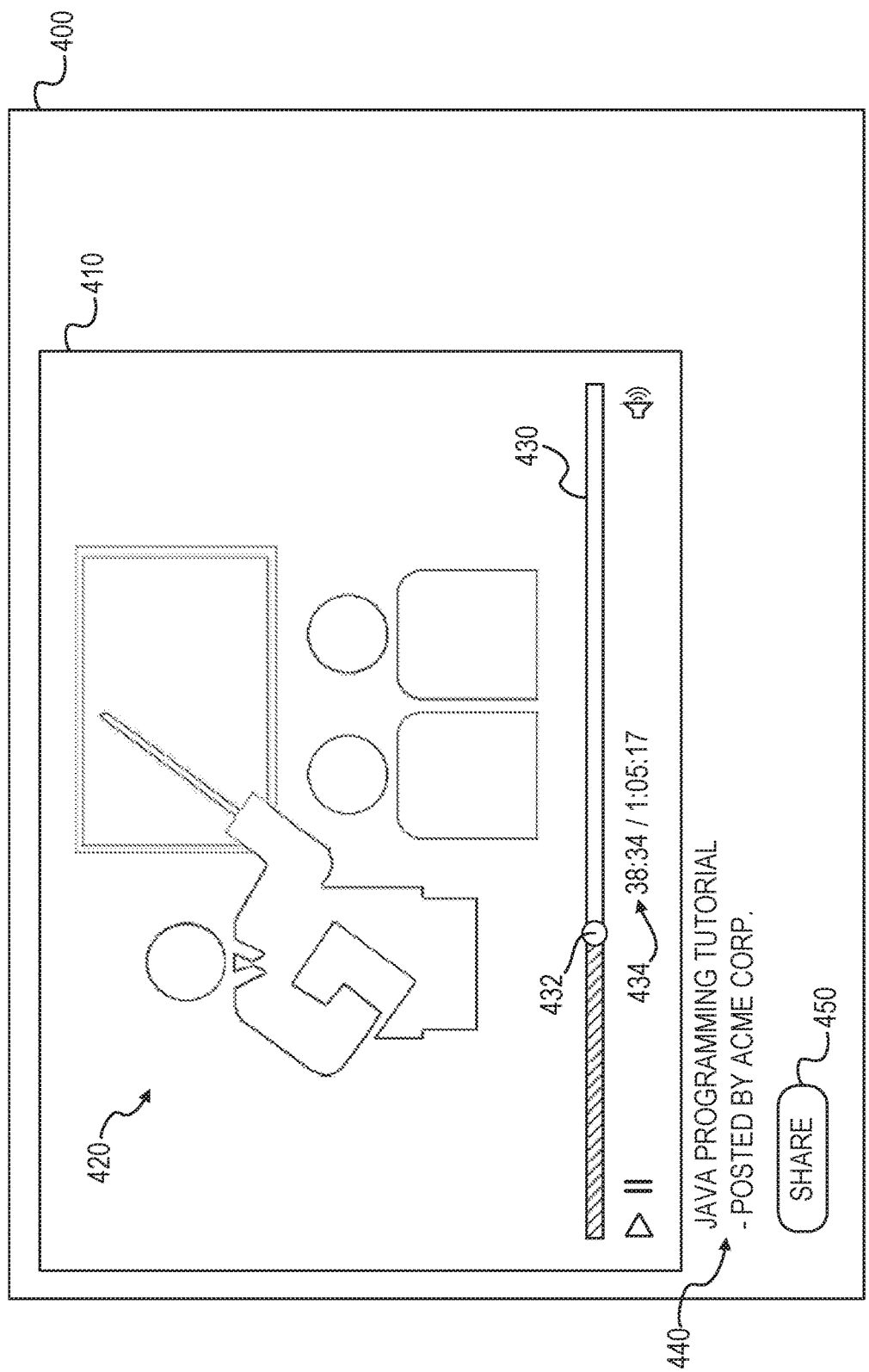
FIG. 4 illustrates a graphical user interface (GUI) displaying a video, in accordance with an example embodiment.

In some example embodiments, the presentation module 320 is configured to cause a video to be played on one or more devices of one or more users. For example, the presentation module 320 may cause a video to be played on a first device of a first user. In some example embodiments, causing a video or any other content to be played or displayed comprises transmitting instructions and/or content to a device, where one or more applications on the device then cause the content to be played or displayed in response to the instructions being received. FIG. 4 illustrates a GUI 400 of a device of a user displaying a video 420, in accordance with an example embodiment. The video may comprise a digital recording of a set of images, such as frames of video content. For example, the video content may comprise a speaker giving a lecture on a particular topic or may comprise any other content comprising visual content and audio content. In some example embodiments, the video 420 is displayed in a dedicated panel 410 within the GUI 400, along with one or more user interface elements for controlling aspects of the video 420, such as a selectable element for playing the video 420, a selectable element for pausing the video 420, and a selectable element for controlling the volume of the video 420.

In some example embodiments, the presentation module 320 is also configured to cause a video progress bar 430 to be displayed within the GUI 400 concurrently with the video 420. The video progress bar 430 comprises a GUI element configured to provide a visualization of the progression of the playing of the video 420. For example, the video progress bar 430 may comprise a graphical control element 432, such as a slider or a track bar, that shows the current playback position of the video 420 (e.g., if the current play of the video 420 is halfway through the entire duration of the video 420, then the graphical control element 432 would be positioned approximately halfway along the video progress bar 430). In some example embodiments, the graphical control element 432 is configured to be manipulated by a user in order to change the current playback position of the video 420 (e.g., by the user clicking/tapping at any point along the video progress bar 430, or by the user dragging the graphical control element 432 along the video progress bar 430 to a different position). In some example embodiments, the presentation module 320 is also configured to cause the current point-in-time 434 of the playback position of the video 420 to be displayed within the GUI 400 concurrently with the video 420.

In some example embodiments, the presentation module 320 is also configured to cause information 440 about the video 420 to be displayed within the GUI 400 concurrently with the video 420. Such information 440 may include, but is not limited to, a title or other identifier of the video 420 (e.g., "JAVA PROGRAMMING TUTORIAL") and an indication of an author or publisher of the video 420 (e.g., "POSTED BY ACME CORP."). It is contemplated that other types of information 440 may also be displayed.

In some example embodiments, the presentation module 320 is also configured to cause a selectable user interface element 450 to be displayed within the GUI 400 concurrently with the video 420. The selectable user interface element 450 is configured to provide, in response to or otherwise based on its selection by a user, an instruction to share the video 420 with one or more other users.

In some example embodiments, the sharing module 330 is configured to receive the instruction to share the video 420 with one or more other users. The instruction may correspond to a point-in-time in the video 420, such as the point-in-time in the video 420 at which the selectable user interface element 450 was selected by the user, which may be indicated by the position of the graphical control element 432 along the video progress bar 430 or the current point-in-time 434 of the playback position of the video 420. For example, in FIG. 4, if the user selected the selectable user interface element 450 (e.g., the selectable "SHARE" button) at a point-in-time that was 38 minutes and 34 seconds into the video 420 (shown as 38:34" in FIG. 4), then the point-in-time 38 minutes and 34 seconds may be stored in association with the instruction to share the video 420 resulting from the selection of the selectable user interface element 450, such as in the form of a timestamp of "38:34" being stored in association with the instruction in database(s) 350.

In some example embodiments, the text determination module 340 is configured to access a stored transcript of the video 420 and to identify text in the transcript that corresponds to the point-in-time corresponding to the instruction to share the video 420. For example, the text determination module 340 may use the point-in-time associated with the instruction as a key in looking up and identifying a portion of text within the transcript that corresponds to that point-in-time in the video, such as by accessing the transcript stored in database 350, and finding the portion of text in the stored transcript that has a timestamp that corresponds to the point-in-time associated with the instruction (e.g., the portion of text having a timestamp within a predetermined range of the point-in-time of the instruction, such as within 5 seconds of the point-in-time of the instruction). In the example shown in FIG. 4, the text determination module 340 may use 38:34 timestamp of the instruction to share as the key in looking up the textual representation of audio synched with that point-in-time within the video 420. In some example embodiments, the text determination module 340 is configured to perform an on-the-fly speech-to-text conversion or translation as an alternative to accessing a stored transcript, which may be useful in situations where a stored transcript is not available. In such on-the-fly embodiments, the text determination module 340 may employ the same timestamp lookup technique discussed above in identifying a portion of text.

Figure 5:
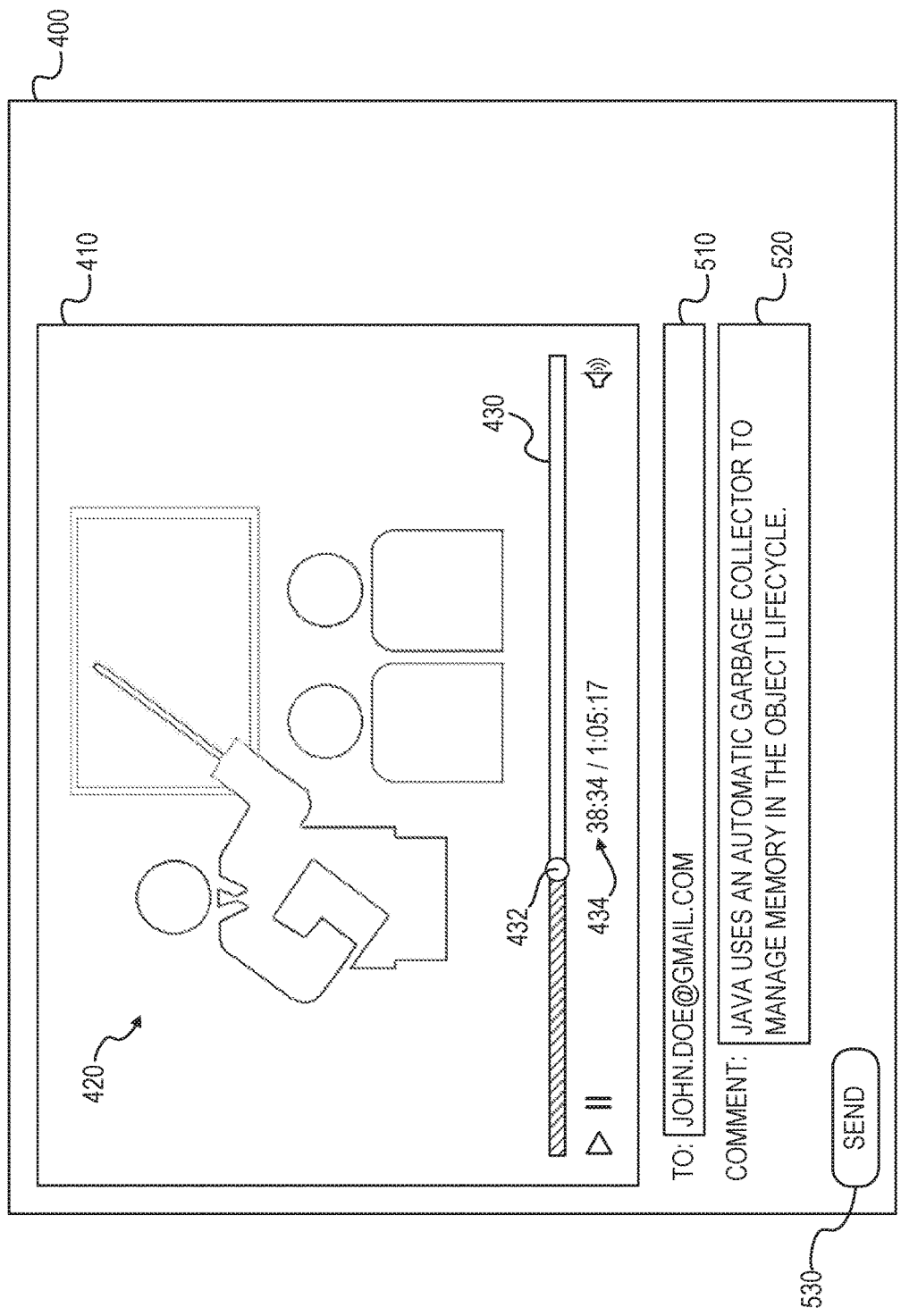
FIG. 5 illustrates a GUI in which a user can edit text to be included in a sharing of a video, in accordance with an example embodiment.

In some example embodiments, the sharing module 330 is configured to cause the identified text to be displayed on the device of the user based on the instruction to share the video 420. FIG. 5 illustrates a GUI 400 in which a user can edit text to be included in a sharing of a video, in accordance with an example embodiment. In FIG. 5, in response to, or otherwise based on, receiving an instruction to share the video 420, the sharing module 330 causes text that has been identified by the text determination module 340 to be displayed within the GUI 400. In the example shown in FIG. 5, the text determination module 340 may identify "JAVA USES AN AUTOMATIC GARBAGE COLLECTOR TO MANAGE MEMORY IN THE OBJECT LIFECYCLE" as the textual representation of audio synched with the 38 minute and 34 second (38:34) point-in-time within the video 420 with which the instruction to share corresponds, such as by using the lookup technique discussed above. As a result, in FIG. 5, the sharing module 330 causes this identified text to be displayed in a text field 520. In some example embodiments, the sharing module 330 is configured to enable the user to edit the identified text, such as by adding text to or deleting text from the displayed identified text via the text field 520. In this respect, the text field 520 is pre-populated with the identified text, which the user may then edit or supplement. For example, the user may identify an error in the translation of the audio of the video 420 into the textual representation of the audio and attempt to correct the error. Additionally or alternatively, the user may use the text field 520 to supplement the identified text with additional information.

The sharing module 330 may also enable the user to provide input identifying one or more other users with whom the video 420 is to be shared. For example, the sharing module 330 may provide a text field 510 within which the user may input one or more e-mail addresses of other users.

When the user is finished identifying the other user(s) with whom the video 420 is to be shared and has approved the text with which the video 420 is to be included in the sharing of the video 420 with the other user(s), the user may select a selectable user interface element 530 (e.g., a "SEND" button) in order to indicate an intent to identity the text in the text field 520 as user-approved text for inclusion along with the video 420 in the sharing of the video 420. In response to the selection of the selectable user interface element 530, the sharing module 330 may generate an instruction to include the user-approved text along with the video in the sharing of the video with the other user(s). In some example embodiments, the user-approved text comprises at least a portion of the identified text.

In some example embodiments, the transcript module 310 is configured to edit the stored version of the transcript of the video 420 based on any edits of the identified text by users. For example, if a user edits the identified text by correcting a misspelling or a mistranslation, that edit may be used to correct the same misspelling or a mistranslation in the stored transcript of the video 420. Additionally or alternatively, if a user edits the identified text to add supplemental information, that edit may be used to add the same supplemental information to the stored transcript of the video 420.

In some example embodiments, the transcript module 310 is configured to modify the speech-to-text algorithm based on one or more edits of identified text by users. The transcript module 310 may employ machine learning techniques using one or more edits of identified text to modify the speech-to-text algorithm used for generating transcripts, thereby improving the accuracy of the speech-to-text algorithm. In some example embodiments, the edits and user-approved text are stored as metadata corresponding to the video or as metadata corresponding to the transcript or both. In some example embodiments, the edits and user-approved text are stored as metadata in association with the corresponding timestamp associated with the particular portion of the video or transcript to which the edits and user-approved text corresponds, such as by using the point-in-time of the instruction to share the video as a reference for the timestamp. This metadata can then be used subsequently by the transcript module 310 in any machine learning processes it performs. For example, the transcript module 310 may employ artificial neural networks and deep learning in using the edits and user-approved text along with the corresponding portion of the audio of the video to train the speech-to-text algorithm, learning how to interpret particular sounds or speech within that portion of the audio and properly convert it into text.

In some example embodiments, the presentation module 320 is configured to cause the user-approved text to be displayed on one or more other devices of the one or more other users in association with the video 420 based on the instruction to share the video 420 and based on the instruction to include the user-approved text. The user-approved text may be displayed on the other device(s) of the other user(s) in association with the video 420 in a variety of ways.

Figure 6:
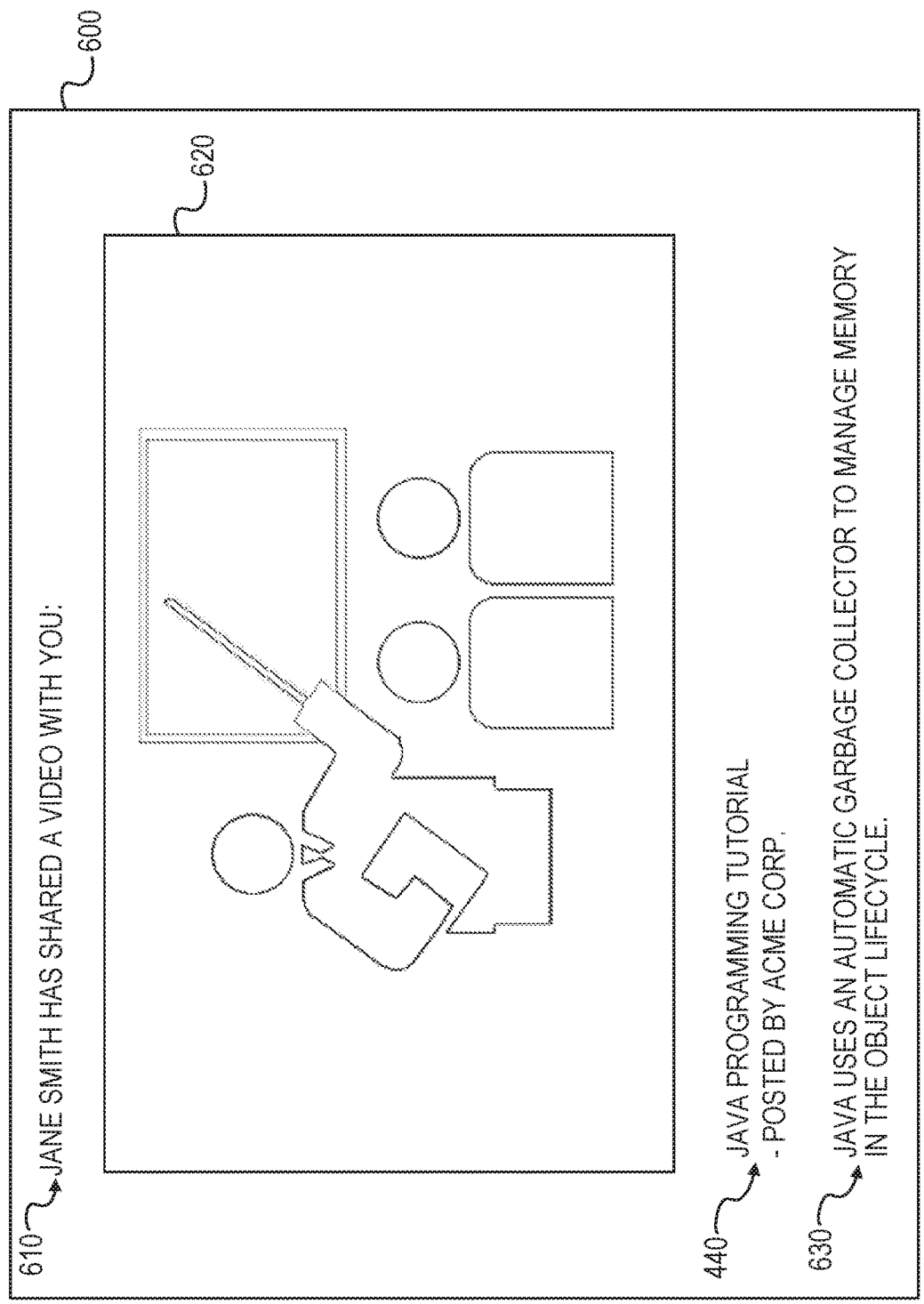
FIG. 6 illustrates one example embodiment of user-approved text being displayed in association with a video, in accordance with an example embodiment.

In some example embodiments, the presentation module 320 is configured to cause the user-approved text to be displayed on the other device(s) of the other user(s) concurrently with a preview of the video 420 on the other device(s). FIG. 6 illustrates one example embodiment of user-approved text 630 being displayed in association with a video 420, where the user-approved text 630 is displayed concurrently with a preview 620 of the video 420, in accordance with an example embodiment. In FIG. 6, a GUI 600 of another device of another user (e.g., a device of another user with whom the first user is sharing the video) displays the preview 620 of the video 420. In some example embodiments, the video 420 comprises a plurality of frames, and the preview 620 of the video 420 comprises at least one of the plurality of frames of the video 420 and less than all of the plurality of frames of the video 420. For example, the preview 620 may comprise one still image (e.g., one frame) of the video 420 or multiple images (e.g., multiple frames) of the video 420 in an animated Graphics Interchange Format (GIF). The multiple images may comprise a set of frames that correspond to a continuous time span of the video 420 (e.g., frames covering the first five seconds of the video 420) or may comprise a set of frames that correspond to non-continuous point-in-time of the video 420 (e.g., five different frames from five different points-in-time in the video 420 that are separated from one after the other by 10 seconds).

In some example embodiments, the GUI 600 may also display a notification 610 that the video 420 is being shared and information 440 about the video 420 (e.g., a title or other identifier of the video 420, an author or publisher of the video 420). The preview 620 and the user-approved text 630 may be presented to the other user(s) in a variety of ways, including, but not limited to, in an e-mail message to the other user(s) and in a feed of the other user(s). In some example embodiments, the presentation module 320 provides a selectable link within the GUI 600 to enable the other user(s) to navigate to or otherwise trigger a presentation of the video 420. For example, at least one of the preview 620 and the information 440 comprise a selectable link configured to navigate the device of the other user to a presentation of the video or to otherwise trigger a presentation of the video 420.

Figure 7:
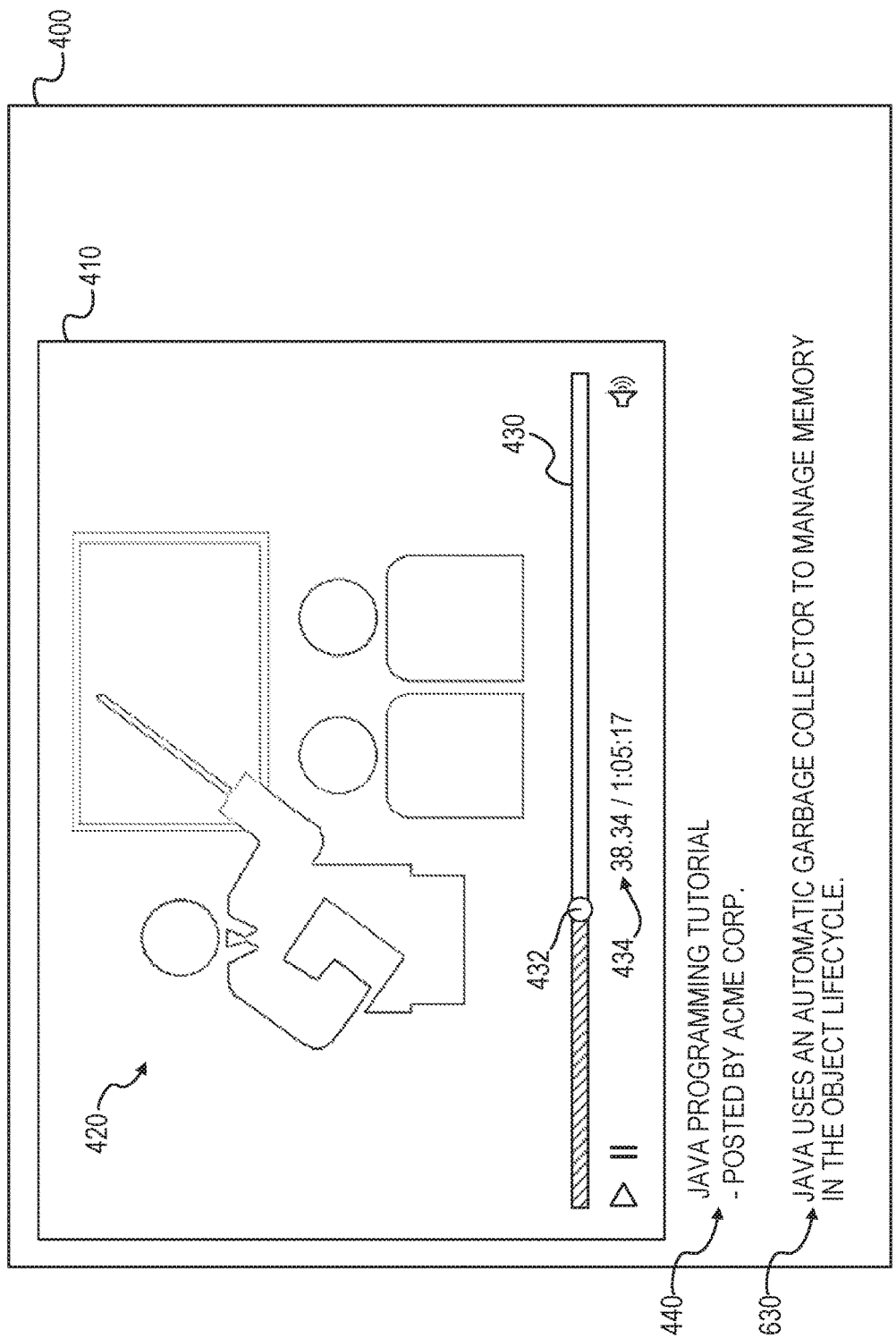
FIG. 7 illustrates another example embodiment of user-approved text being displayed in association with a video, in accordance with an example embodiment.

In some example embodiments, the presentation module 320 is configured to cause the user-approved text 630 to be displayed on the other device(s) of the other user(s) concurrently with a playing of the video 420 on the other device(s). FIG. 7 illustrates another example embodiment of user-approved text 630 being displayed concurrently with a playing of the video 420, in accordance with an example embodiment. This presentation of the video 420 along with the user-approved text 630 to the other user may be triggered by or otherwise based on the original user providing the instruction to share the video 420 or on the other user providing an instruction to view the video 420 (e.g., by selecting a selectable link, such as one of the selectable links discussed above with respect to FIG. 6). The video 420 may be presented to the other user using elements similar to those discussed above with respect to the presentation of the video 420 to the original user in FIG. 4. However, in presenting the video 420 to the other user, the presentation module 320 also displays the user-approved text 630. In some example embodiments, the presentation module 320 causes the video 420 to begin playing at the same point-in-time associated with the instruction to share the video 420, thereby providing the portion of the video 420 indicated to be of interest by the original user to the other user immediately without the other user having to wait through all of the video content preceding that portion of the video 420. By employing these technical solutions, the video relevance system 216 significantly reduces instances of users playing irrelevant portions of a video, thereby addressing the technical problem of excessive consumption of electronic resources (e.g., network bandwidth over which video is transmitted, battery of device on which video is played) that accompany the playing of such irrelevant portions.

Figure 8:
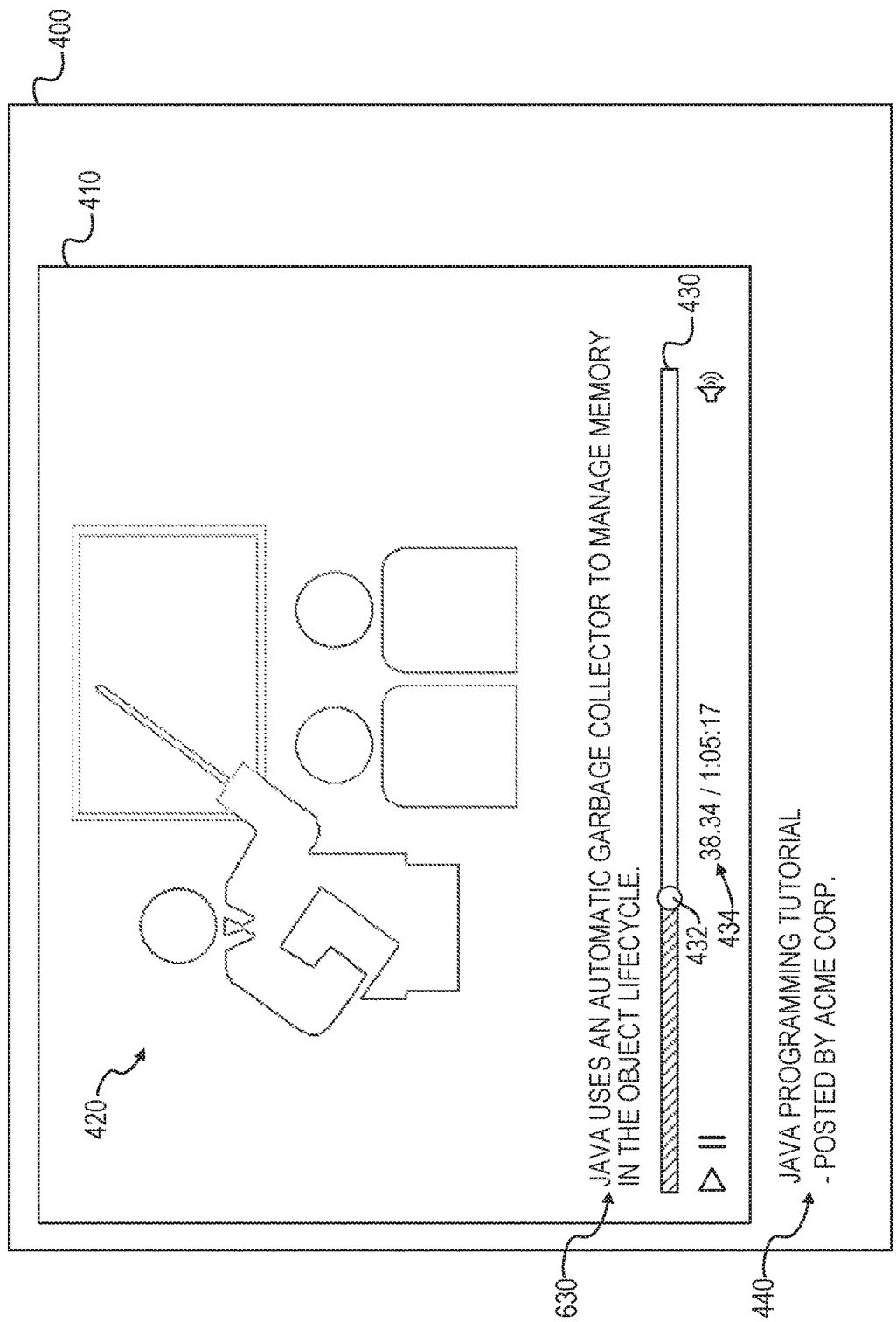
FIG. 8 illustrates yet another example embodiment of user-approved text being displayed in association with a video, in accordance with an example embodiment.

In FIG. 7, the user-approved text 630 is displayed below the dedicated panel 410 in which the video 420 is displayed. However, it is contemplated that other embodiments are also within the scope of the present disclosure. FIG. 8 illustrates another example embodiment of the user-approved text 630 being displayed concurrently with a playing of the video 420, in accordance with an example embodiment. In FIG. 8, instead of the user-approved text 630 being displayed in a separate section of the GUI 400 from the video 420, the user-approved text 630 is displayed within the dedicated panel 410 within which the video 420 is played. In some example embodiments, the user-approved text 630 is displayed in a position overlaying the video 420.

Figure 9:
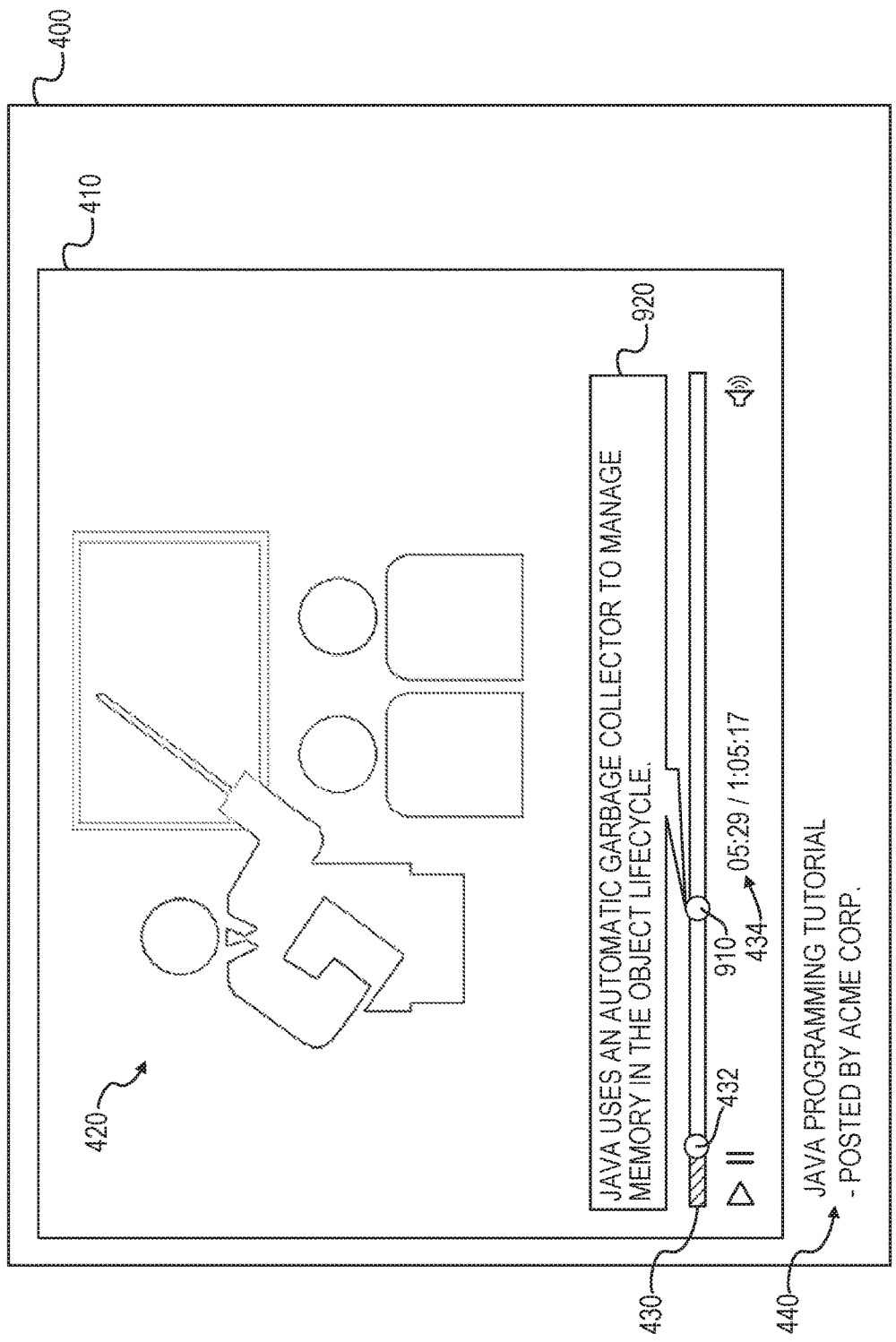
FIG. 9 illustrates yet another example embodiment of user-approved text being displayed in association with a video, in accordance with an example embodiment.

In some example embodiments, the presentation module 320 is configured to cause one or more points-of-interest to be displayed along a video progress bar on the other device(s) of the other user(s) concurrently with the playing of the video 420 on the other device(s). FIG. 9 illustrates yet another example embodiment of user-approved text being displayed concurrently with a playing of the video 420, where a point-of-interest 910 is displayed along the video progress bar 430, in accordance with an example embodiment. As seen in FIG. 9, the user-approved text may be displayed in association with the point-of-interest 910. For example, a callout box 920 comprising the user-approved text 630 may be displayed as being connected to the point-of-interest 910. In some example embodiments, the user-approved text is displayed in association with the point-of-interest 910 in response to a user action directed towards the point-of-interest 910, such as the user clicking or tapping on the point-of-interest 910 or the user hovering a pointer over the point-of-interest 910. By displaying the user-approved text in association with the point of interest 910, the user can see which moments in the video 420 to skip to along the video progress bar 430, thereby making the presentation and viewing of the video 420 more efficient.

In some example embodiments, the presentation module 320 is configured to determine a point-of-interest for a video based on the point-of-time associated with the instruction to share the video. For example, the timestamp of the point-in-time associated with the instruction to share the video may be used as the point-in-interest. However, sometimes the point-in-time associated with the instruction to share the video is not properly aligned with the beginning of a portion of the video that the user found interesting or relevant and wanted to share. For example, the user may be watching a particular portion of the video and decide 20 seconds into that portion of the video to share the video. As a result, the point-in-time at which the user selected the user interface element to share the video may be positioned in the middle of a sentence being spoken.

Figure 10:
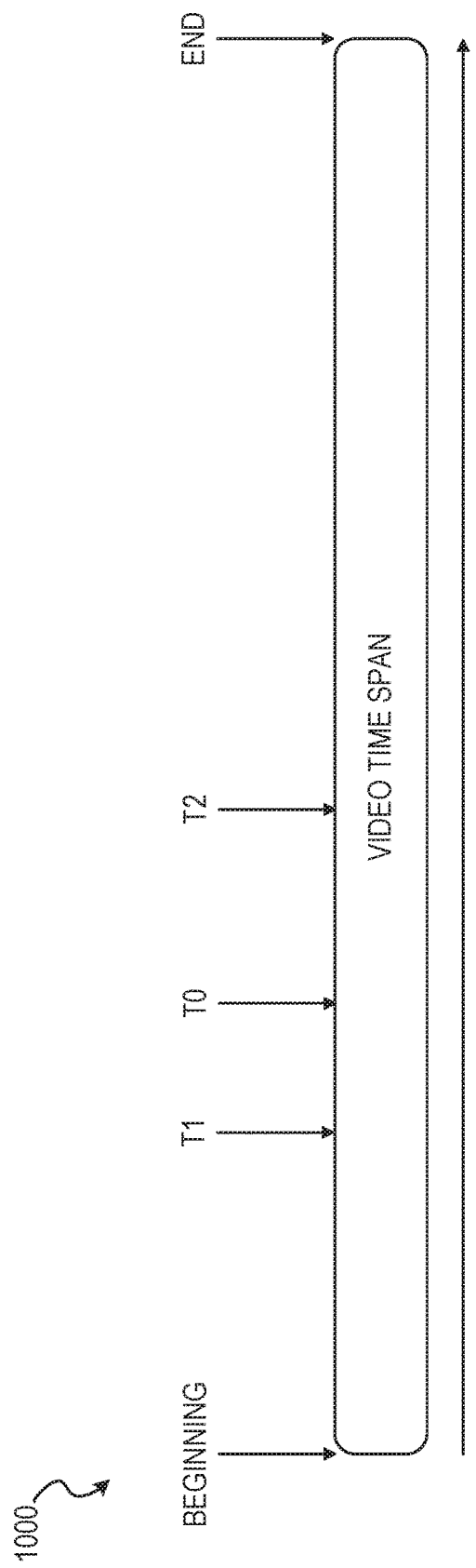
FIG. 10 illustrates a video time span, in accordance with an example embodiment.

FIG. 10 illustrates a video time span 1000, in accordance with an example embodiment. The video time span 1000 runs from the beginning of a video to the end of the video. The location along the video time span 1000 at which a user submits an instruction to share the video (e.g., clicks a "SHARE" button) provides a strong indication of a point-of-interest of the video. In one example, a user may submit an instruction to share the video at time T0. Such a scenario presents three possibilities: (1) the point-of-interest starts at T1 and ends at T0, where T1<T0: (2) the point-of-interest starts at T0 and ends at T2, where T0<T2: and (3) the point-of-interest starts at T1 and ends at T2, where T1<T0<T2. In some example embodiments, the presentation module 320 is configured to determine a start of a point-of-interest and an end of a point-of-interest based on the point-in-time associated with the instruction from the original user to share the video. In addition to basing this determination on the point-in-time associated with the instruction from the original user to share the video, the presentation module 320 may also base this determination on one or more other factors as well.

In some example embodiments, one of these other factors comprises an analysis of at least one of the video and the transcript of the video using the point-in-time associated with the instruction as a reference point from which to perform the analysis. The presentation module 320 may analyze the audio track of the video or the transcript of the video to identify a section of silence that satisfies a predetermined threshold, which can be used to identify a separation between topics of the video. For example, if the point-in-time associated with the instruction to share is aligned with the middle of a sentence, the presentation module 320 may analyze the audio track to find the beginning of the sentence by finding a moment of silence that lasts at least one second or may analyze the transcript to find the beginning of the sentence based on punctuation (e.g., finding the first period '.' To precede the sentence). In some example embodiments, the presentation module 320 performs a semantic analysis of the audio track or the transcript to identify a change in topic.

In some example embodiments, another one of the factors includes activity signals by one or more other users. Such activity signals may include, but are not limited to, points-in-time associated with instructions by other users to share the same video, points-in-time at which other users started playing the video, points-in-time at which other users stopped playing the video, and points-in-time to which the other users skipped the playing of the video.

Figure 11:
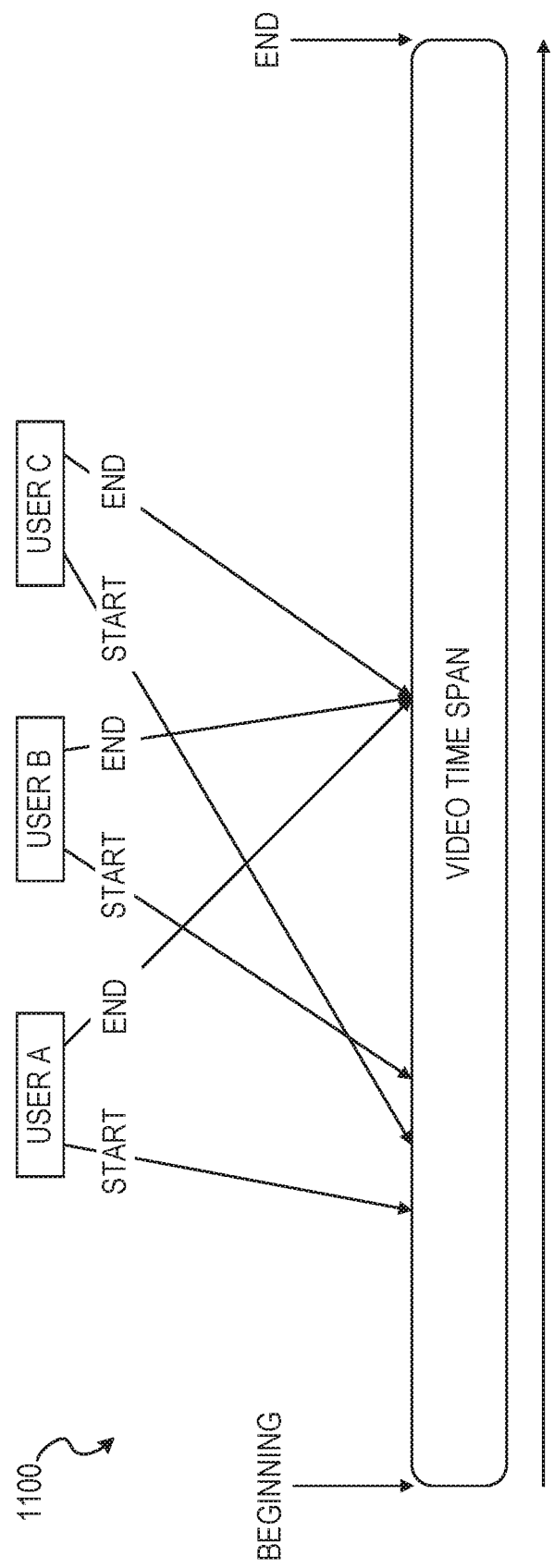
FIG. 11 illustrates activity signals comprising different start and end times of the playing of a video for different users, in accordance with an example embodiment.

One issue that arises in determining points-of-interest based on activity signals of different users is the potential disparity between different users with respect to the points-in-time corresponding to their activity signals. FIG. 11 illustrates activity signals 1100 comprising different start and end times of the playing of a video for different users, in accordance with an example embodiment. In FIG. 11, activity signals for users A, B, and C are shown along the video time span. Users A, B, and C may provide indications of a start point-of-interest (e.g., starting to play the video at the start point-of-interest, skipping to the start point-of-interest) at significantly different times, with the start point-of-interest of user A being well before the start point-of-interest of user C, and the start point-of interest of user C being well before the start point-of-interest of user B. In this example, since these start points-of-interest are significantly dispersed, a single start point-of-interest for all of users A, B, and C as a collective may be determined using a mode or median of the different times of the start points-of-interest, such as by setting the single start point-of-interest as the mode or median of the different times. The same technique may also be employed for determining a single end point-of-interest for all of the users as a collective if the end points-of-interest are determined to be sufficiently dispersed along the video time span.

In some example embodiments, the presentation module 320 is configured to select one or more other users whose activity signals are to be used in determining one or more points-of-interest for a video. The selection of the one or more other users may be based on a comparison of at least one characteristic of the other users with at least one characteristic of the original user. For example, the presentation module 320 may select other users based on their level of connectedness with the original user (e.g., other users that are identified as connections of the original user may be selected based on their connection), as well as their level of similarity with respect to social networking profile characteristics, such as job title, job industry, company, skills, professional interests, education, and seniority level, among others (e.g., other users satisfying a minimum threshold level of similarity with respect to one or more characteristics may be selected based on their satisfaction of this threshold).

The selection of the one or more other users may additionally or alternatively be based on a comparison of at least one characteristic of the other users with at least one characteristic of the video. For example, the presentation module 320 may select other users based on their level of relevance to the video, such as by comparing social networking profile characteristics of the other users (e.g., job title, job industry, company, skills, professional interests, and education) with characteristics of the video, such as similarity with or other relevance to the title of the video, to a description of the video, to an author or publisher of the video, to comments on the video, and to words or topics identified in the transcript of the video, among other things.

Figure 12:
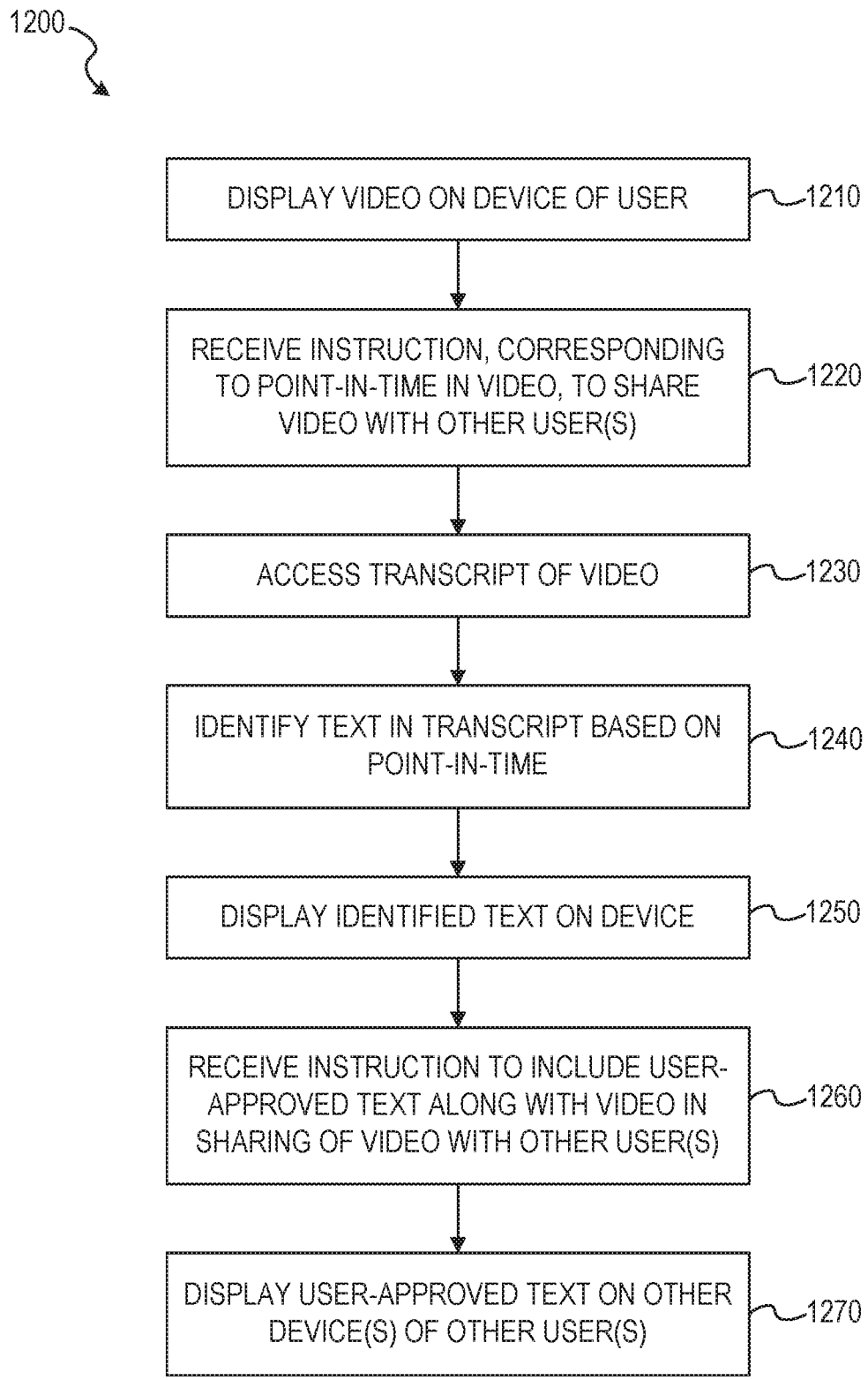
FIG. 12 is a flowchart illustrating a method of identifying a relevance of a video that is being shared, in accordance with an example embodiment.

FIG. 12 is a flowchart illustrating a method 1200 of identifying a relevance of a video that is being shared, in accordance with an example embodiment. Method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the video relevance system 216 of FIGS. 2-3, or any combination of one or more of its modules, as described above.

At operation 1210, the video relevance system 216 causes a video to be played on a first device of a first user. At operation 1220, the video relevance system 216 receives, from the first device of the first user, an instruction to share the video with one or more other users. In some example embodiments, the instruction corresponds to a first point-in-time in the video. In some example embodiments, the video relevance system 216 detects a user selection of a graphical user interface element during the playing of the video on the first device, with the user selection having been made at the first point-in-time in the video during the playing of the video on the first device. At operation 1230, the video relevance system 216 accesses a transcript of the video. In some example embodiments, the transcript of the video is stored on a database (e.g., database 350), and the video relevance system 216 accesses the database to access the stored transcript. At operation 1240, the video relevance system 216 identifies text in the transcript based on the first point-in-time. At operation 1250, the video relevance system 216 causes the identified text to be displayed on the first device in response to, or otherwise based on, the instruction to share the video. At operation 1260, the video relevance system 216 receives, from the first device, an instruction to include user-approved text along with the video in the sharing of the video with the one or more other users. In some example embodiments, the user-approved text comprises at least a portion of the identified text. At operation 1270, the video relevance system 216 causes the user-approved text to be displayed on one or more other devices of the one or more other users in association with the video based on the instruction to share the video and on the instruction to include the user-approved text.

It is contemplated that any of the other features described within the present disclosure can be incorporated into method 1200.

Figure 13:
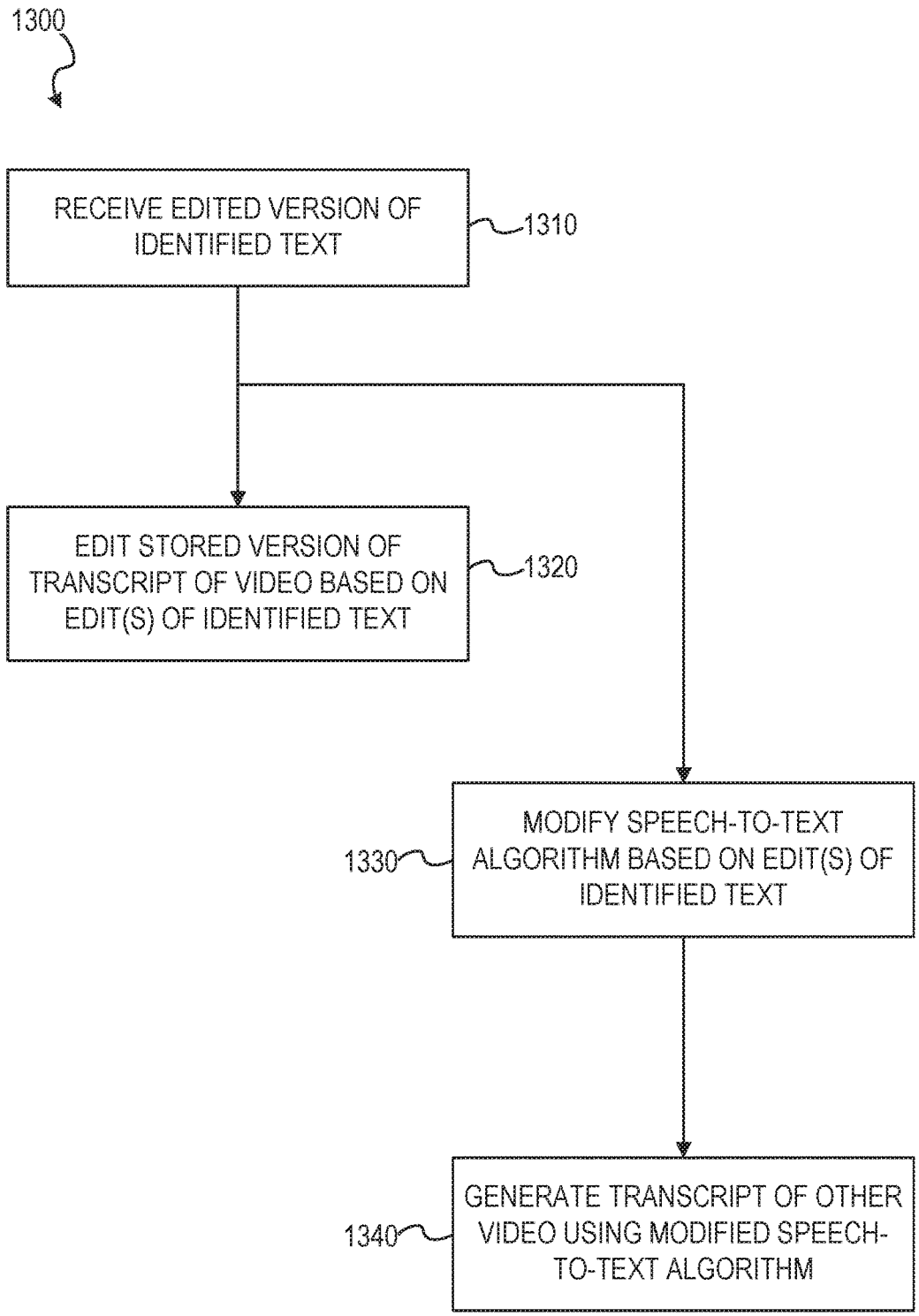
FIG. 13 is a flowchart illustrating a method of receiving an instruction to include user-approved text along with a video in a sharing of the video, in accordance with an example embodiment.

FIG. 13 is a flowchart illustrating a method 1300 of receiving an instruction to include user-approved text along with a video in a sharing of the video, in accordance with an example embodiment. Method 1300 can be performed by processing logic that can comprise hardware (e.g., circuitry, dedicated logic, programmable logic, microcode, etc.), software (e.g., instructions run on a processing device), or a combination thereof. In one implementation, the method 1300 is performed by the video relevance system 216 of FIGS. 2-3, or any combination of one or more of its modules, as described above.

At operation 1310, the video relevance system 216 receives, from the first device, an edited version of the identified text. In some example embodiments, the edited version represents at least one edit of the identified text by the first user, with the at least one edit comprising at least one addition of text to the identified text or at least one deletion of text from the identified text. At operation 1320, the video relevance system 216 edits a stored version of the transcript of the video based on the at least one edit of the identified text.

In some example embodiments, the video relevance system 216 is configured to generate transcripts of videos using a speech-to-text algorithm. In some example embodiments, the method 1300 further comprises modifying the speech-to-text algorithm based on the at least one edit of the identified text, at operation 1330, and then generating a transcript of another video using the modified speech-to-text algorithm, at operation 1340.

It is contemplated that any of the other features described within the present disclosure can be incorporated into method 1300.

Figure 14:
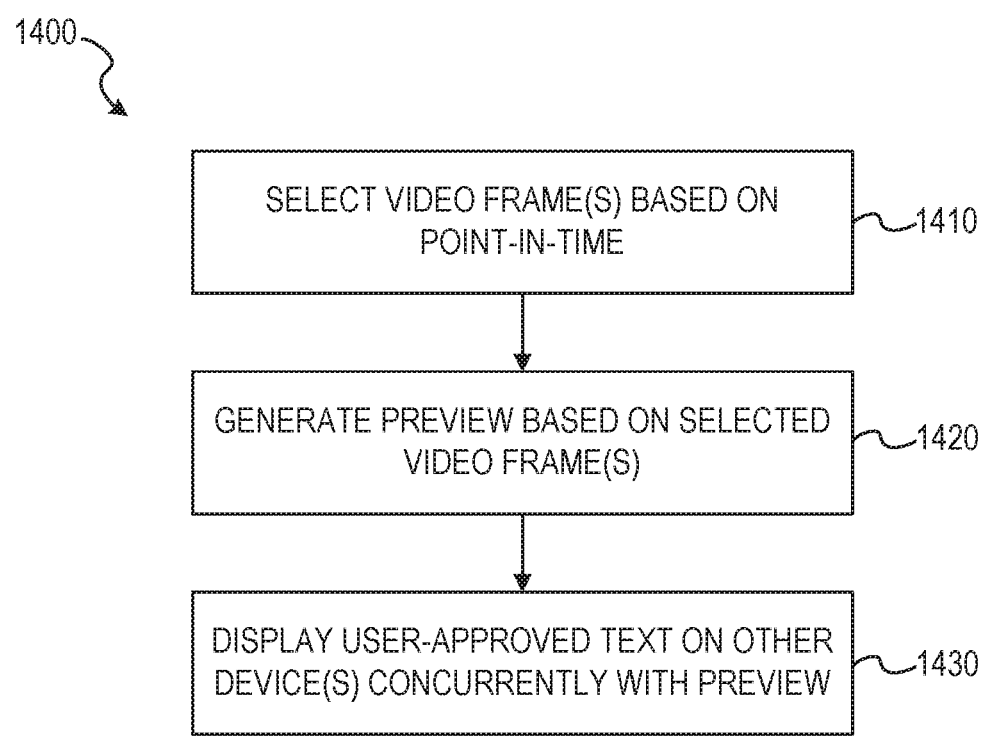
FIG. 14 is a flowchart illustrating a method of displaying user-approved text concurrently with a preview of a video, in accordance with an example embodiment.

FIG. 14 is a flowchart illustrating a method 1400 of displaying user-approved text concurrently with a preview of a video, in accordance with an example embodiment. Method 1400 can be performed by processing logic that can comprise hardware (e.g., circuitry, dedicated logic, programmable logic, microcode, etc.), software (e.g., instructions run on a processing device), or a combination thereof. In one implementation, the method 1400 is performed by the video relevance system 216 of FIGS. 2-3, or any combination of one or more of its modules, as described above.

At operation 1410, the video relevance system 216 selects at least one of a plurality of frames of the video to be shared based on the first point-in-time in the video. In some example embodiments, the selecting of the at least one of the plurality of frames is further based on at least one supplemental point-in-time in the video, where the at least one supplemental point-in-time corresponds to at least one other instruction received from at least one other user to share the video. In some example embodiments, the at least one supplemental point-in-time is selected for use in the selecting the at least one of the plurality of frames based on a comparison of at least one characteristic of the at least one other user from which the at least one other instruction was received with at least one characteristic of the first user or with at least one characteristic of the video. At operation 1420, the video relevance system 216 generates a preview of the video based on the selected frame(s), with the preview comprising the selected frame(s). In some example embodiments, the preview comprises at least one of the plurality of frames of the video and less than all of the plurality of frames of the video. At operation 1430, the video relevance system 216 causes the user-approved text to be displayed on the one or more other devices of the one or more other users concurrently with the preview of the video on the one or more other devices.

It is contemplated that any of the other features described within the present disclosure can be incorporated into method 1400.

Figure 15:
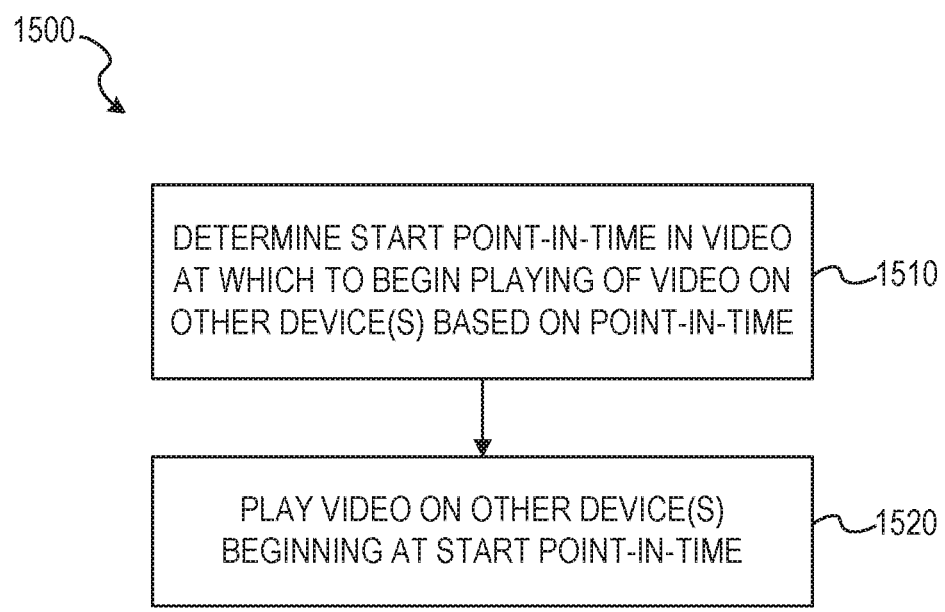
FIG. 15 is a flowchart illustrating a method of displaying user-approved text concurrently with a playing of a video, in accordance with an example embodiment.

FIG. 15 is a flowchart illustrating a method 1500 of displaying user-approved text concurrently with a playing of a video, in accordance with an example embodiment. Method 1500 can be performed by processing logic that can comprise hardware (e.g., circuitry, dedicated logic, programmable logic, microcode, etc.), software (e.g., instructions run on a processing device), or a combination thereof. In one implementation, the method 1500 is performed by the video relevance system 216 of FIGS. 2-3, or any combination of one or more of its modules, as described above.

At operation 1510, the video relevance system 216 determines a start point-in-time in the video at which to begin the playing of the video on the one or more other devices based on the first point-in-time. In some example embodiments, the determining of the start point-in-time comprises analyzing at least one of the video and the transcript of the video using the first point-in-time, and determining the start point-in-time based on the analyzing, with the start point-in-time being an earlier time in the video than the first point-in-time. In some example embodiments, the determining of the start point-in-time is further based on at least one supplemental point-in-time in the video, where the at least one supplemental point-in-time corresponds to at least one other instruction received from at least one other user to share the video. In some example embodiments, the at least one supplemental point-in-time is selected for use in the determining of the start point-in-time based on a comparison of at least one characteristic of the at least one other user from which the at least one other instruction was received with at least one characteristic of the first user or with at least one characteristic of the video. At operation 1520, the video relevance system 216 causes the video to be played on the one or more other devices beginning at the start point-in-time.

It is contemplated that any of the other features described within the present disclosure can be incorporated into method 1500.

Example Mobile Device

Figure 16:
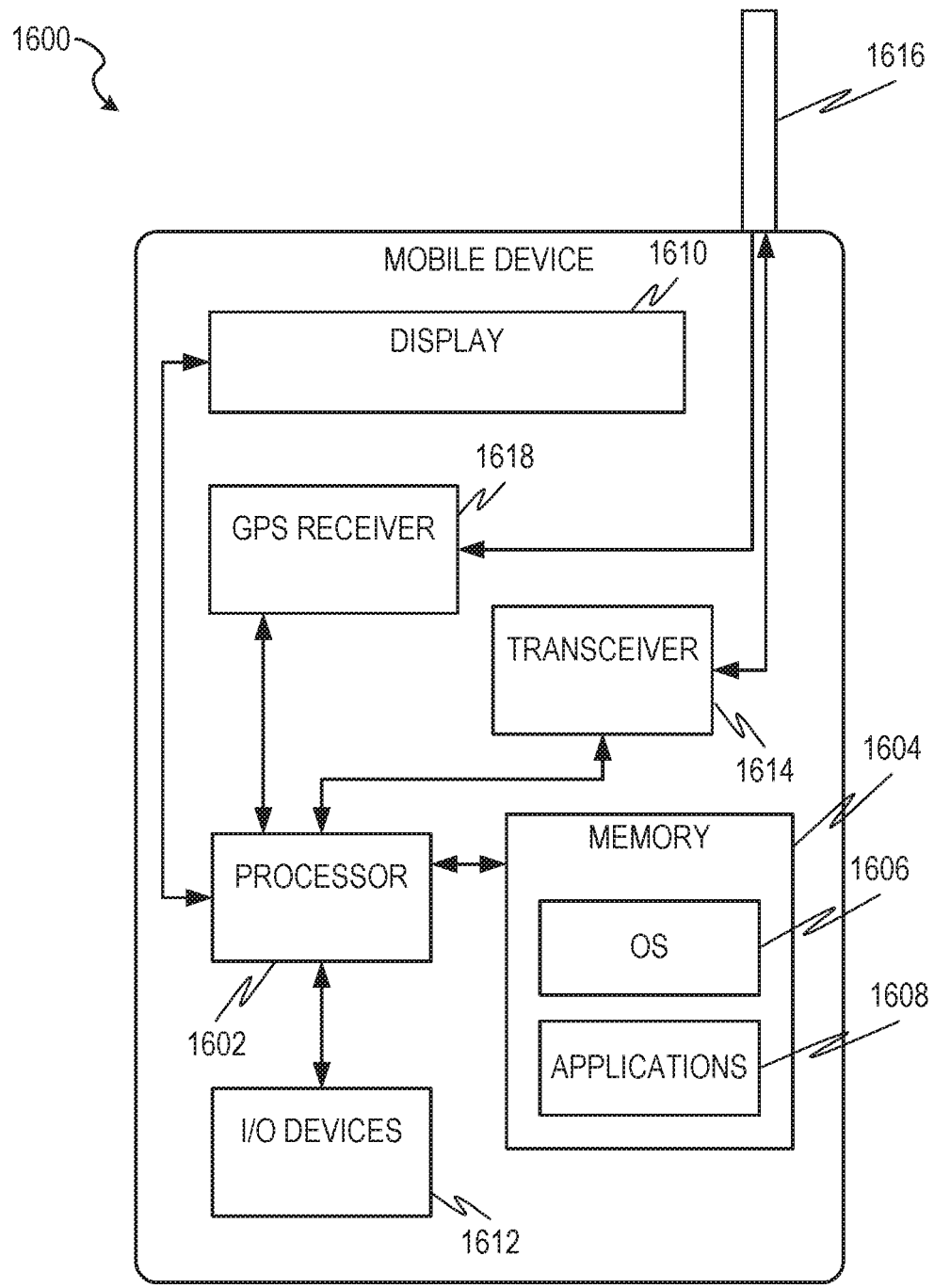
FIG. 16 is a block diagram illustrating a mobile device, in accordance with some example embodiments.

FIG. 16 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 17:
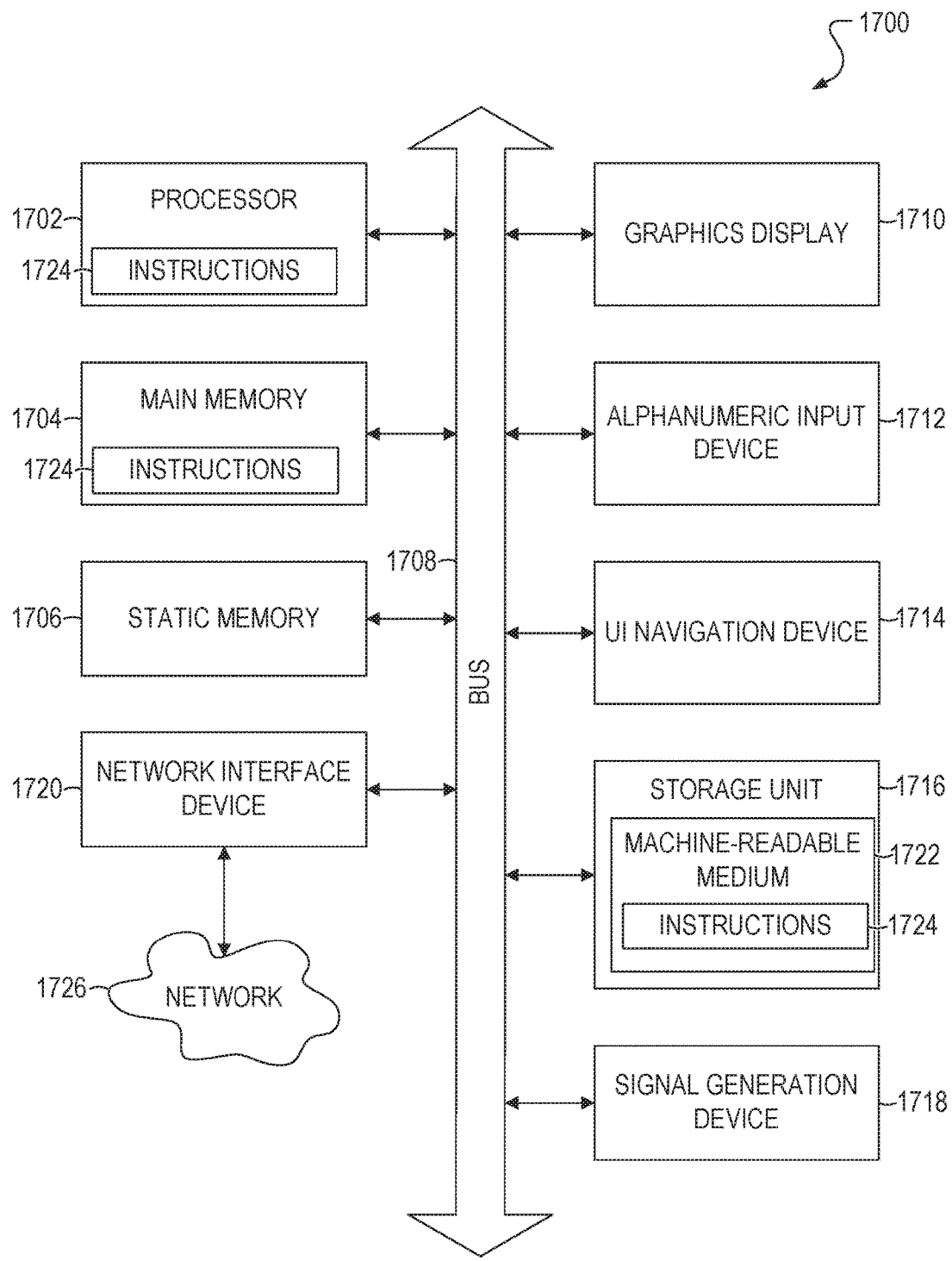
FIG. 17 is a block diagram of an example computer system on which methodologies described herein may be executed, in accordance with an example embodiment.

FIG. 17 is a block diagram of an example computer system 1700 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    causing, by at least one hardware processor, a video to be played on a first device of a first user;
    receiving, by the at least one hardware processor from the first device of the first user, an instruction to share the video with one or more other users, the instruction corresponding to a first point-in-time in the video;
    accessing, by the at least one hardware processor, a transcript of the video;
    identifying, by the at least one hardware processor, text in the transcript based on the first point-in-time;
    causing, by the at least one hardware processor, the identified text to be displayed on the first device based on the instruction to share the video;
    receiving, by the at least one hardware processor from the first device, an instruction to include user-approved text along with the video in the sharing of the video with the one or more other users, the user-approved text comprising at least a portion of the identified text; and
    causing, by the at least one hardware processor, the user-approved text to be displayed on one or more other devices of the one or more other users in association with the video based on the instruction to share the video and on the instruction to include the user-approved text.

2. The computer-implemented method of claim 1, wherein receiving the instruction to share the video comprises detecting a user selection of a graphical user interface element during the playing of the video on the first device, the user selection having been made at the first point-in-time in the video during the playing of the video on the first device.

3. The computer-implemented method of claim 1, wherein the receiving the instruction to include the user-approved text comprises receiving, from the first device, an edited version of the identified text, the edited version representing at least one edit of the identified text by the first user, the at least one edit comprising at least one addition of text to the identified text or at least one deletion of text from the identified text.

4. The computer-implemented method of claim 3, further comprising editing a stored version of the transcript of the video based on the at least one edit of the identified text.

5. The computer-implemented method of claim 3, further comprising:
    generating the transcript of the video using a speech-to-text algorithm; and
    modifying the speech-to-text algorithm based on the at least one edit of the identified text.

6. The computer-implemented method of claim 1, wherein the causing the user-approved text to be displayed comprises causing the user-approved text to be displayed on the one or more other devices of the one or more other users concurrently with a preview of the video on the one or more other devices, the video comprising a plurality of frames, the preview of the video comprising at least one of the plurality of frames of the video and less than all of the plurality of frames of the video.

7. The computer-implemented method of claim 6, further comprising:
    selecting the at least one of the plurality of frames based on the first point-in-time in the video; and
    generating the preview based on the selected at least one of the plurality of frames, the preview comprising the selected at least one of the plurality of frames.

8. The computer-implemented method of claim 7, wherein the selecting the at least one of the plurality of frames is further based on at least one supplemental point-in-time in the video, the at least one supplemental point-in-time corresponding to at least one other instruction received from at least one other user to share the video.

9. The computer-implemented method of claim 8, further comprising selecting the at least one supplemental point-in-time for use in the selecting the at least one of the plurality of frames based on a comparison of at least one characteristic of the at least one other user from which the at least one other instruction was received with at least one characteristic of the first user or with at least one characteristic of the video.

10. The computer-implemented method of claim 1, wherein the causing the user-approved text to be displayed comprises causing the user-approved text to be displayed on the one or more other devices of the one or more other users concurrently with a playing of the video on the one or more other devices.

11. The computer-implemented method of claim 10, further comprising:
    determining a start point-in-time in the video at which to begin the playing of the video on the one or more other devices based on the first point-in-time; and
    causing the video to be played on the one or more other devices beginning at the start point-in-time.

12. The computer-implemented method of claim 11, wherein the determining the start point-in-time comprises:
    analyzing at least one of the video and the transcript of the video using the first point-in-time; and
    determining the start point-in-time based on the analyzing, the start point-of-time being an earlier time in the video than the first point-in-time.

13. The computer-implemented method of claim 11, wherein the determining of the start point-in-time is further based on at least one supplemental point-in-time in the video, the at least one supplemental point-in-time corresponding to at least one other instruction received from at least one other user to share the video.

14. The computer-implemented method of claim 13, further comprising selecting the at least one supplemental point-in-time for use in the determining of the start point-in-time based on a comparison of at least one characteristic of the at least one other user from which the at least one other instruction was received with at least one characteristic of the first user or with at least one characteristic of the video.

15. The computer-implemented method of claim 10, wherein the causing the user-approved text to be displayed comprises causing a point-of-interest to be displayed along a video progress bar on the one or more other devices concurrently with the playing of the video on the one or more other devices, the point-of-interest being determined based on the first point-in-time, the user-approved text being displayed in association with the point-of-interest.

16. A system comprising:
at least one hardware processor, and
a non-transitory machine-readable medium embodying a set of instructions that, when executed by the at least one hardware processor, cause the at least one processor to perform operations, the operations comprising:
causing a video to be played on a first device of a first user;
receiving, from the first device of the first user, an instruction to share the video with one or more other users, the instruction corresponding to a first point-in-time in the video;
accessing a transcript of the video;
identifying text in the transcript based on the first point-in-time;
causing the identified text to be displayed on the first device based on the instruction to share the video;
receiving, from the first device, an instruction to include user-approved text along with the video in the sharing of the video with the one or more other users, the user-approved text comprising at least a portion of the identified text; and
causing the user-approved text to be displayed on one or more other devices of the one or more other users in association with the video based on the instruction to share the video and on the instruction to include the user-approved text.

17. The system of claim 16, wherein receiving the instruction to share the video comprises detecting a user selection of a graphical user interface element during the playing of the video on the first device, the user selection having been made at the first point-in-time in the video during the playing of the video on the first device.

18. The system of claim 16, wherein the receiving the instruction to include the user-approved text comprises receiving, from the first device, an edited version of the identified text, the edited version representing at least one edit of the identified text by the first user, the at least one edit comprising at least one addition of text to the identified text or at least one deletion of text from the identified text.

19. The system of claim 18, wherein the operations further comprise editing a stored version of the transcript of the video based on the at least one edit of the identified text.

20. A non-transitory machine-readable medium embodying a set of instructions that, when executed by at least one hardware processor, cause the processor to perform operations, the operations comprising:
causing a video to be played on a first device of a first user;
receiving, from the first device of the first user, an instruction to share the video with one or more other users, the instruction corresponding to a first point-in-time in the video;
accessing a transcript of the video;
identifying text in the transcript based on the first point-in-time;
causing the identified text to be displayed on the first device based on the instruction to share the video;
receiving, from the first device, an instruction to include user-approved text along with the video in the sharing of the video with the one or more other users, the user-approved text comprising at least a portion of the identified text; and
causing the user-approved text to be displayed on one or more other devices of the one or more other users in association with the video based on the instruction to share the video and on the instruction to include the user-approved text.

\* \* \* \* \*

UNITED STATES PATENT AND TRADEMARK OFFICE
CERTIFICATE OF CORRECTION

PATENT NO. : 10,129,573 B1
APPLICATION NO. : 15/710035
DATED : November 13, 2018
INVENTOR(S) : Sahasrabudhe et al.

Page 1 of 1

It is certified that error appears in the above-identified patent and that said Letters Patent is hereby corrected as shown below:

In the Claims

In Column 23, Line 22, in Claim 16, delete "processor," and insert --processor;-- therefor Signed and Sealed this
Twenty-eighth Day of April, 2020

Andrei Iancu
*Director of the United States Patent and Trademark Office*